United States Patent [19]
Wazeter, III

[11] Patent Number: 4,917,047
[45] Date of Patent: Apr. 17, 1990

[54] MODULAR COMPONENT KNOCK-DOWN ANIMAL CAGE STRUCTURE AND ASSEMBLY

[75] Inventor: Francis X. Wazeter, III, Kalamazoo, Mich.

[73] Assignee: International Research and Development Corporation, Mattawan, Mich.

[21] Appl. No.: 203,699

[22] Filed: Jun. 7, 1988

[51] Int. Cl.⁴ .............................................. A01K 1/03
[52] U.S. Cl. ..................................................... 119/17
[58] Field of Search ....................... 119/17, 19, 48, 20, 119/21, 155; 403/161, 154, 150; 256/26

[56] References Cited

U.S. PATENT DOCUMENTS

| | | | |
|---|---|---|---|
| 894,638 | 7/1908 | Heim | 119/19 X |
| 1,458,736 | 6/1923 | Stewart | 119/17 |
| 2,581,318 | 1/1952 | Bartlett | 119/20 |
| 2,857,880 | 10/1958 | Stone, Jr. | 119/19 |
| 3,204,606 | 9/1965 | Parr et al. | 119/20 |
| 3,550,558 | 12/1970 | Sachs | 119/15 |
| 3,884,188 | 5/1975 | Arends | 119/20 |
| 3,905,333 | 9/1975 | Uhrig | 119/17 |
| 4,345,547 | 8/1982 | Lynch | 119/20 |
| 4,367,694 | 1/1983 | Goyheneix | 119/48 X |

FOREIGN PATENT DOCUMENTS

| | | | |
|---|---|---|---|
| 920894 | 2/1973 | Canada | 119/19 |
| 2127369 | 12/1972 | Fed. Rep. of Germany | 119/17 |

Primary Examiner—Robert P. Swiatek
Assistant Examiner—Nicholas D. Lucchesi
Attorney, Agent, or Firm—Gordon W. Hueschen

[57] ABSTRACT

A modular knock-down animal cage unit and cage assembly, erected from standard modules or modulae which are interchangeable, and which may be readily assembled and disassembled conveniently and economically for washing and storage, with minimum space requirements, and rapidly and conveniently reassembled, is disclosed. The animal cage units or cage assemblies are releasably suspended from and do not come into contact with the frame upon which they are mounted, thereby enabling the supporting frame to be produced from relatively inexpensive material, such as galvanized pipe, even though the cage unit proper is constructed of relatively expensive material such as stainless steel. The cage units and assemblies allow for rapid and convenient clean-out of animal waste material and, since the cage units and cage assemblies are not wall-mounted, room is available for maintaining hygienic conditions both within the cage units themselves and in the surroundings including the flooring on all sides of the cage assembly.

23 Claims, 3 Drawing Sheets

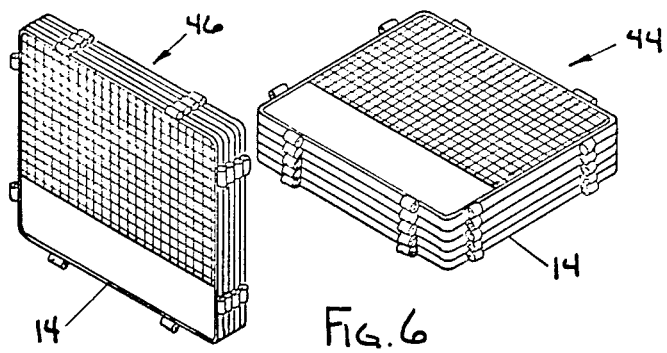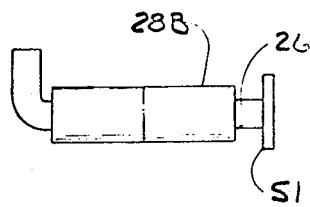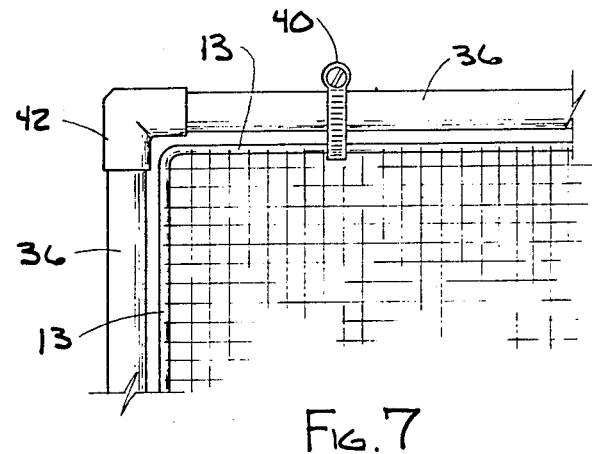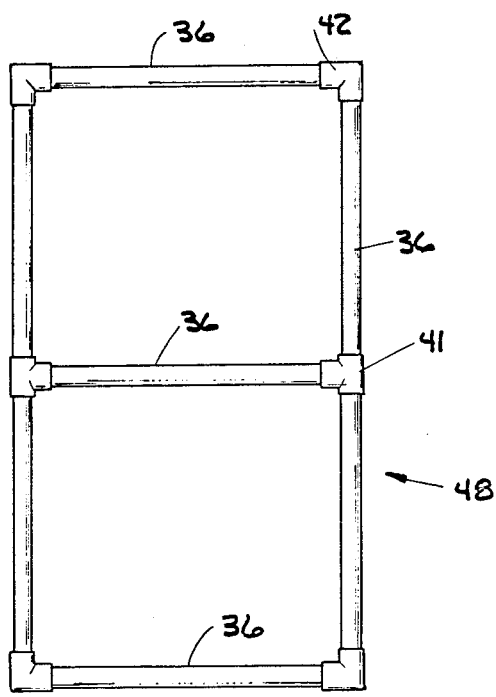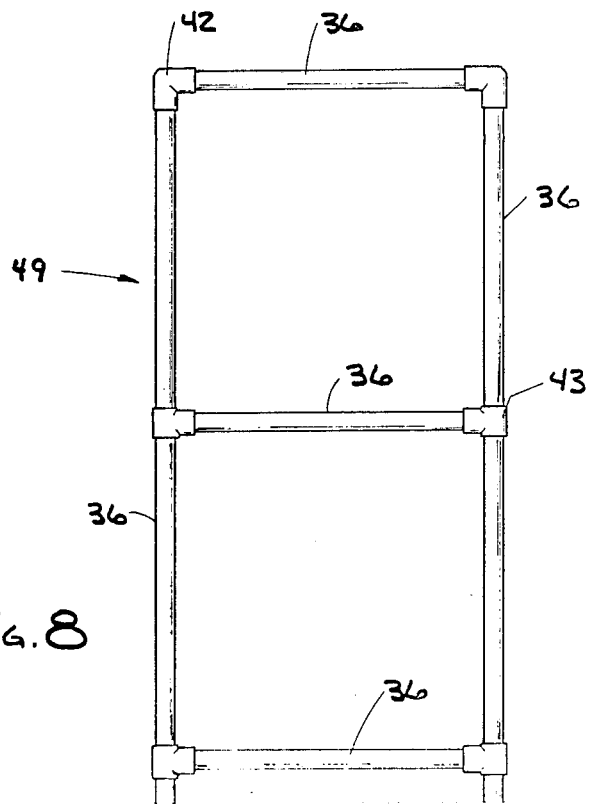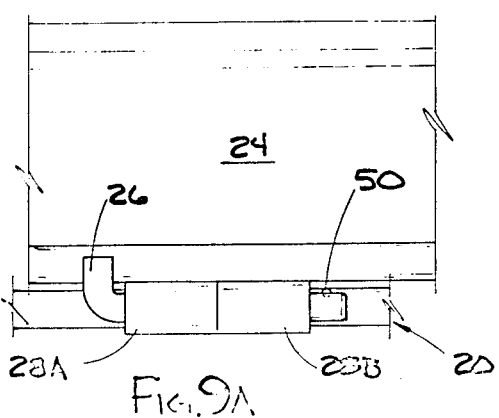

MODULAR COMPONENT KNOCK-DOWN ANIMAL CAGE STRUCTURE AND ASSEMBLY

FIELD OF INVENTION

Knock-down animal cage units of a modular nature constructed of modular components; assemblies of such cage units; modular mounting frame units or structures; and such cage units or assemblies hung or suspended from a frame unit rather than rigidly mounted to a frame or wall.

BACKGROUND OF THE INVENTION AND PRIOR ART

By the term "cage" as used herein is intended the usual dictionary meaning of a box or enclosure having openwork such as wires or bars for confining birds or animals. According to the present invention, the cage unit is particularly adapted for the confinement of animals. Further, in the instant case, the cage unit is of a generally rectangular although not necessarily square nature, as will be apparent from the disclosure hereinafter.

Innumerable such cage units and assemblies have been constructed and innumerable others have been proposed. Representative of such items, as revealed by a search in the U.S. Patent Office, are those of U.S. Pat. Nos. 1,179,703; 1,227,814; 1,812,598; 2,041,049; 2,640,460; 2,789,531; 2,892,562; 3,087,459; and 4,161,159.

These patents disclose animal and bird cage units and assemblies of various types, sizes, and shapes, the last patent involving stacked cages and a novel feeding device between cages, the '459 patent involving portable and stackable cages with five (5) solid walls, the '562 patent involving a foldable cage construction which is stackable, the '531 patent involving a collapsible cage for birds, the '460 patent involving an exercise cage for birds and animals involving a plurality of cylindrical units, the '049 patent involving a stacked collapsible chicken brooder arranged in battery form with each unit constituting a side of the battery, the '598 patent involving a stackable cage or coop structure, the '814 patent disclosing a collapsible or foldable bird cage, and the 1916 '703 patent disclosing a poultry coop or crate which could be knocked down but which in assembled form could be rigidly supported by a frame.

Although all of the previous animal cage structures accomplished their objectives to a greater or lesser extent, certain problems continue to haunt or plague those portions of industry which require the caging and proper hygienic care and maintenance of large numbers of animals, as for example when they are to be utilized for pharmacological or toxicological evaluation of drugs, poisons, inhalants, or other materials with which a human is likely to come into contact. Among the remaining problems are the elimination of wall-mounted cages to permit cleaning behind the backs of cages; the ability to dissemble the cages rapidly an conveniently for washing or storage; the ability to rapidly assemble or reassemble the cages from the individual elements comprising the same; the ability to conveniently remove feces and other animal waste from the immediate vicinity of the caged animal for maintaining maximum cleanliness and hygienic living conditions; and finally but foremost the ability to provide the animal with living conditions which are as wholesome as possible while in a caged situation and with ready access to the animal whenever desired, all of the foregoing with a minimum of inconvenience and economy. The animal cage industry has long awaited developments which would even partially fulfill these requirements, but few have been forthcoming.

The present invention is based upon the concept of a standard module or modulus and is accordingly considered to be a modular system, involving not only modular cage elements but modular cage units and modular cage assemblies which, when arranged according to the present invention and description, especially when suspended from modular frame units of the invention, go far toward solving at least partially all of the aforementioned problems which have previously been nearly insoluble, the cage unit and cage system or assembly of the present invention being particularly adapted for the hygienic containment of animals such as monkeys, beagles, and the like.

OBJECTS OF THE INVENTION

It is accordingly an object of the present invention to provide new and improved animal cages which are based upon a standard module or modulus, both with respect to the elements comprising the animal cages and the assembled animal cages themselves. It is a further object to avoid the disadvantages of the prior art as set forth in the foregoing, and to provide a type of animal cage which has unprecedented convenience from the standpoint of ready assembly and disassembly, storage, washing, maintenance of hygienic conditions, access to the animal, and so on. It is another object of the invention to provide such modular cages wherein the sides are interchangeable, the tops are interchangeable, the rear walls are interchangeable, the bottom walls are interchangeable, and front panels and doors are interchangeable. It is still a further object to provide such modular cage elements and units wherein the various elements are rapidly assembled and disassembled by means of complementary or matching sockets or sleeves and lock pins which are readily removable or removably securable as desired. A still further object of the invention is to provide such a modular cage unit and assembly of cages which may conveniently be hung or suspended from a frame unit, itself advantageously comprised of modular elements. A major object of the invention is to provide such modular cage elements, units, assemblies, and suspended assemblies with maximum convenience and economics inasmuch as the elements are essentially identical for assembly of the cage units and for assembly of the supporting frames, so that a minimum of time is wasted in needless operations due to improperly fitting or out-of-round elements, since the various elements for assembly of the cage unit and supporting frame unit are modular or identical. Another object is to provide an animal cage assembly wherein the animal cage does not come into contact with its supporting frame, being rather suspended therefrom, which provides the advantage that the cage may be of stainless steel and the frame can be of more economical material, e.g., galvanized pipe, instead of the usual and more expensive stainless steel. Still other objects of the invention will become apparent hereinafter and still additional objects will be obvious to one skilled in the art as this description proceeds.

SUMMARY OF THE INVENTION

The invention, then, comprises the following aspects, inter alia:

a knock-down cage unit for animals or the like which is capable of rapid assembly and disassembly comprising the following elements in combination:

a pair of side wall sections, a top wall section, a bottom wall section, and a rear wall section, each of said sections comprising at peripheral edges a plurality of sockets or sleeves adapted to juxtapose and align with complementary sockets or sleeves at peripheral edges of adjacent or contiguous wall sections, said sockets or sleeves when complimentarily juxtaposed and aligned being adapted to be releasably secured together by the insertion of lock pins therein (this term being broad enough to include "therethrough"), and lock pins in said sockets or sleeves on adjacent or contiguous wall sections thereby releasably securing said sections and forming a rectangular cage unit which is open at the front;

such a cage unit comprising face plates secured at the front peripheral edges of wall sections, the first face plate attached to one of said wall sections comprising a plurality of sockets or sleeves, and the second of said face plates attached to an opposite wall section comprising latch means, a door section comprising at its one peripheral edge complementary sockets or sleeves adapted to juxtapose and align with the plurality of sockets or sleeves on said first face plate, lock pins in said sockets or sleeves on said first face plate and on said peripheral edge of said door section for hinging said door to said face plate, and cooperating latch means on the opposite peripheral edge of said door section, whereby said door section may be swung upon its hinges on said first face plate on said one wall section into juxtaposition with the second face plate on the other of said wall sections, thereby closing the open front of said cage unit, and whereby said door may be secured in closed position by said latch means on said door section and by said cooperating latch means on said second face plate;

such a cage unit comprising face plates secured at the front peripheral edges of said side wall sections, the first face plate attached to one of said side wall sections comprising a plurality of sockets or sleeves, and the second of said face plates attached to the other of said side wall sections comprising latch means, a door section comprising at its one peripheral edge complementary sockets or sleeves adapted to juxtapose and align with the plurality of sockets or sleeves on said first face plate, lock pins in said sockets or sleeves on said face plate and on said peripheral edge of said door section for hinging said door to said first face plate, and cooperating latch means on the opposite peripheral edge of said door section, whereby said door section may be swung upon its hinges on said first face plate on said one side wall section into juxtaposition with the second face plate on the other of said side wall sections, thereby closing the open front of said cage unit, and whereby said door may be secured in closed position by said latch means on said door section and by said cooperating latch means on said second face plate;

such a modular cage unit, suspended in a frame unit comprising upright members and horizontal or transverse members by suspension means securing, preferably releasably securing, said cage unit, at its upper peripheral edges, to transverse members of said frame unit, whereby said cage unit is suspended from said frame unit without the necessity of coming into contact with said frame unit;

such a cage and frame assembly, wherein said frame unit comprises upper and lower transverse members and wherein cage units are suspended in vertical juxtaposition to each other from both upper and lower transverse members of said frame unit;

such a cage and frame assembly, comprising also a wash-out tray beneath the bottom wall section of an upper cage unit associated with generally vertical drain means to facilitate convenient removal of waste material from said upper cage unit;

a plurality of such cage units, in side-by-side relationship, having a centrally located face plate with a pair of latch means thereon in side-by-side relationship, the door sections of said side-by-side cage units being respectively hinged at the right and left of said cage units and adapted to have the latch means on the unhinged peripheral edges of said door sections secured by said pair of latch means on said centrally-located face plate;

a plurality of such cage units, suspended in such a frame;

such a cage structure, wherein said lock pin comprises a detent ball for releasably securing said lock pin in said juxtapositioned complementary sockets or sleeves;

such a cage structure wherein said lock pin comprises a grommet or knock-off washer for releasably securing said lock pi in said juxtapositioned complementary sockets or sleeves;

such a cage and frame assembly, wherein said suspending means comprises a hose clamp;

such an assembly, wherein said frame unit comprises horizontal and vertical members which are of the same length and of the same cross-sectional configuration;

such a cage structure, wherein said latch means on said face plate comprises a plurality of guides and a lock bar slideably retained therein adapted to receive and retain cooperating latch means on the unhinged peripheral edge of said door section;

such a cage structure, wherein said side wall and/or rear wall sections comprise splash guards as lower segments thereof;

such a cage structure, wherein said bottom or floor section comprises a foraminous member of sufficient strength to support the animal weight and with sufficiently large foraminae therein to allow the dropping of animal waste material therethrough;

and such a cage structure, wherein said floor structure comprises a series of spaced-apart straps or slats.

Furthermore, in its broadest aspects, the invention comprises:

a knock-down cage unit for animals or the like which is capable of rapid assembly and disassembly comprising the following elements in combination:

a pair of side wall sections, a top wall section, a bottom wall section, and a rear wall section, a plurality of said sections comprising at peripheral edges a plurality of sockets or sleeves adapted to juxtapose and align with complementary sockets or sleeves at peripheral edges of adjacent or contiguous wall sections, said sockets or sleeves when complementarily juxtaposed and aligned being adapted to be releasably secured together by the insertion of lock pins therein, and lock pins in said sockets or sleeves on adjacent or contiguous wall sections thereby releasably securing said sections;

such a cage unit comprising a door section having one peripheral edge thereof hingedly mounted at the front of one wall section, latch means comprised at the front of an opposite wall section, and cooperating latch means comprised on a peripheral edge of said door section opposite to said hingedly-mounted peripheral edge, whereby said door section may be swung upon its hinges at the front of said one wall section into juxtaposition with the front of the other of said wall sections, thereby closing the open front of said cage unit, and whereby said door may be secured in closed position by said latch means on said door section and by said cooperating latch means at the front of said wall section;

such a cage unit comprising a door section having one peripheral edge thereof hingedly mounted at the front of one side wall section, latch means comprised at the front of an opposite side wall section, and cooperating latch means comprised on a peripheral edge of said door section opposite to said hingedly-mounted peripheral edge, whereby said door section may be swung upon its hinges at the front of said one side wall section into juxtaposition with the front of the other of said side wall sections, thereby closing the open front of said cage unit, and whereby said door may be secured in closed position by said latch means on said door section and by said cooperating latch means at the front of said side wall section;

such a modular cage unit, suspended in a frame unit comprising upright members and horizontal or transverse members by suspension means securing, preferably releasably securing, said cage unit, at its upper peripheral edges, to transverse members of said frame unit, whereby said cage unit is suspended from said frame unit without the necessity of coming into contact with said frame unit;

and finally, structural knock-down cage elements adapted to be erected into a cage unit for animals or the like which cage unit is capable of rapid assembly and disassembly comprising the following elements:

a pair of side wall sections, a top wall section, a bottom wall section, and a rear wall section, a plurality of said wall sections comprising at peripheral edges a plurality of sockets or sleeves adapted to juxtapose and align with complementary sockets or sleeves at peripheral edges of adjacent or contiguous wall sections, said sockets or sleeves when complementarily juxtaposed and aligned being adapted to be releasably secured together by the insertion of lock pins therein.

DESCRIPTION OF THE DRAWINGS

A more complete understanding of the invention may be had by reference to the following detailed description when taken in conjunction with the accompanying drawings, wherein:

FIG. 6 is a perspective view of two (2) stacks of modular cage elements in disassembled condition for washing or storage.

FIG. 7 is an enlarged view of a segment of a cage unit, its suspending means, and its supporting frame unit taken along the line 7——7 of FIG. 3.

FIG. 8 is a side view of a modular frame unit according to the invention.

FIG. 9 is a top view of a modular frame unit according to the invention.

FIG. 9A is an enlarged view showing a complementary connecting socket or sleeve and lock pin structure employed according to the invention, and FIG. 9B is an enlarged view of another version of the complementary connecting socket or sleeve and lock pin structure shown in FIG. 9A.

DETAILED DESCRIPTION OF THE INVENTION

Figure 1:
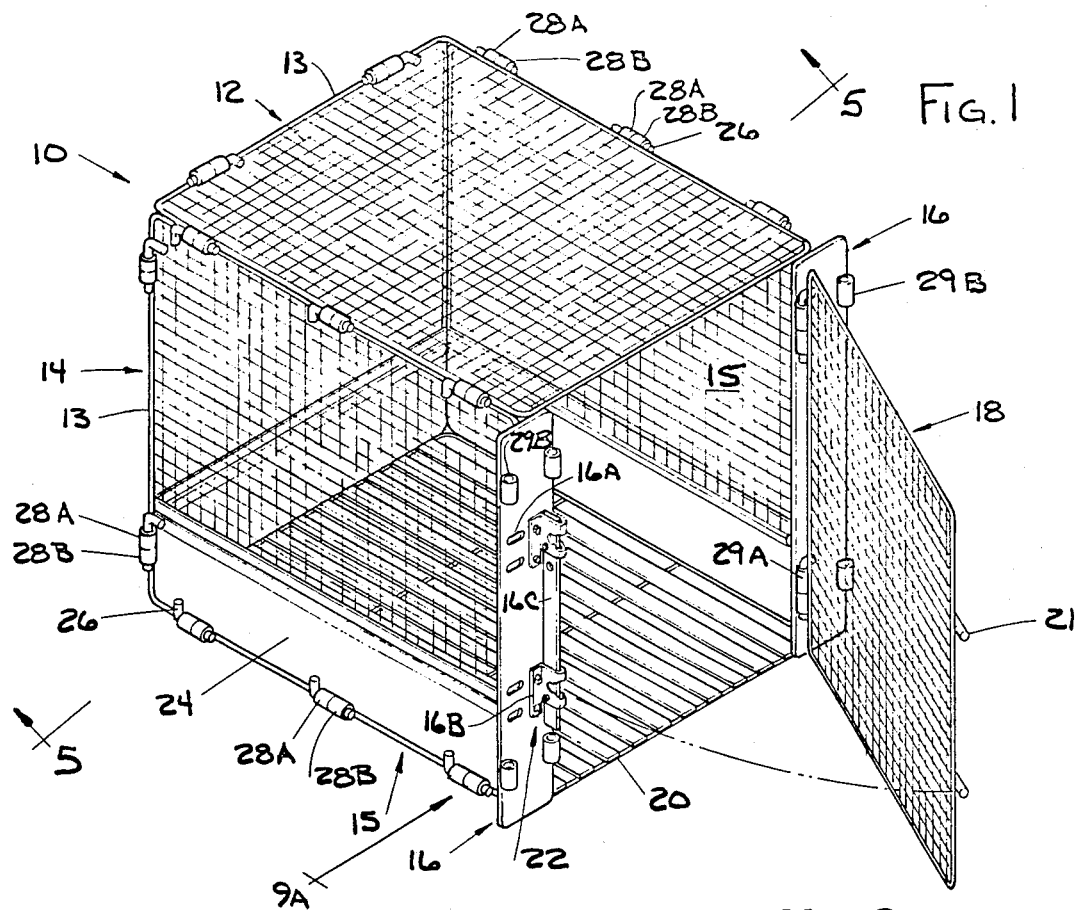
FIG. 1 is a front left perspective view of a single cage unit according to the invention.
Figure 4:
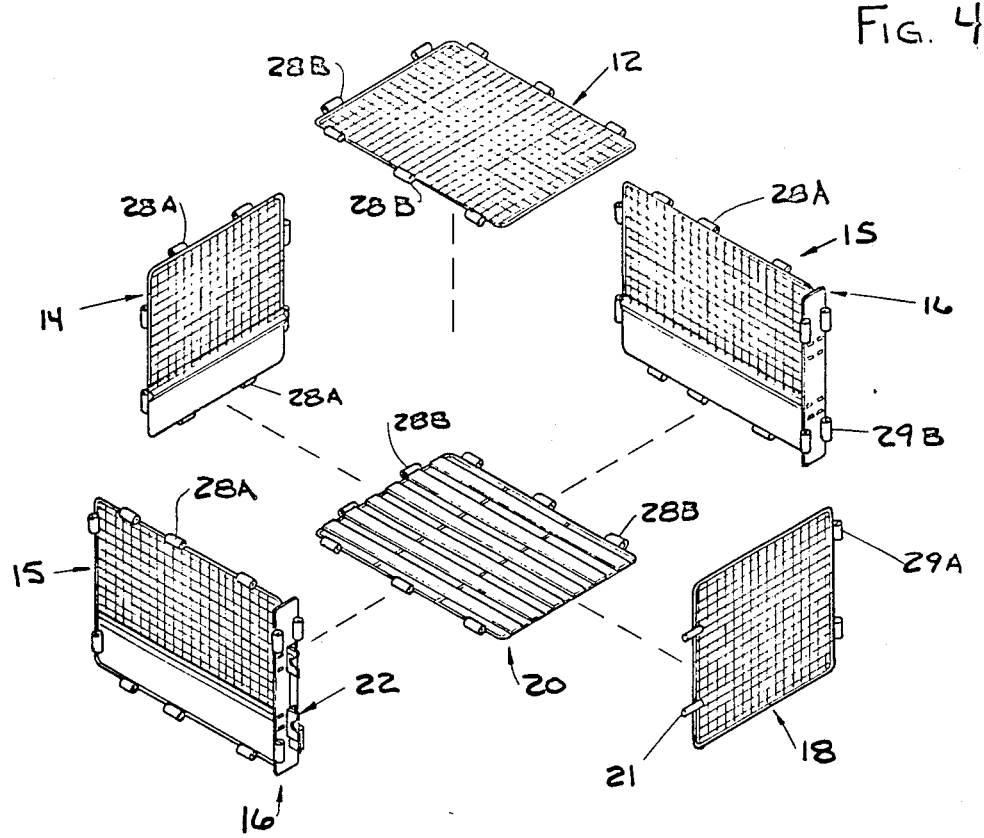
FIG. 4 is an exploded view of a cage unit showing the various individual modular cage elements.

Referring now to the drawings, and particularly to FIG. 1 thereof, a fully erected modular animal cage unit according to the invention is shown generally at 10. For ready reference to the various modular elements comprising the cage unit, the standard modular elements are shown in exploded form in FIG. 4. These, when assembled, produce a cage unit of FIG. 1. As shown in FIGS. 1 and 4, the cage unit comprises modular side-wall sections 15, top wall section 12, bottom or floor section 20, rear wall section 14, and front or door section 18. These elements or sections are also seen in assembled state in FIG. 1 together with matching or complementary connecting sockets or sleeves 28A and 28B, these juxtapositioned cooperating sleeves being releasably secured by lock pins 26 so as to provide a rectangular cage unit having a top section 12, a bottom or floor section 20, side sections 15, rear wall section 14, and front wall or door element or section 18, in which the various wall sections have adjacent peripheral edges, which are not necessarily contiguous since some small or narrow spaces may remain between the peripheries of the various sections in some cage units, although the sleeves or sockets 28A, 28B and 29A, 29B forming a part of the various sections are ordinarily in touching relationship. Door section 18 as shown is hingedly mounted at its one vertical peripheral edge by means of socket or sleeve 29A, complementary or matching sleeve 29B on face plate 16, and once again secured by lock pins 26 extending through both juxtapositioned sleeves. Face plates 16 may be secured by welding or the like to the front vertical edges of side sections or elements 15, the face plates again being identical and completely reversible.

Alternatively, a face plate 16 may be releasably secured to a side section 15 by means of complementary sleeve members 29A and 29B and lock pins 26 (not shown) in the same manner as adjacent or contiguous wall sections of the cage unit are releasably secured together, thus making the cage units even more modular and capable of ready assembly and disassembly. Face plates 16 may alternatively be secured or releasably secured in the manner indicated to the front peripheral edge of the cage top wall section and bottom wall section and the cage door section hung and latched in the manner indicated from the top to bottom or bottom to top, although with somewhat less convenience and modularity, as will readily be apparent to one skilled in the art.

Face plates 16 are replete with apertures 16A for the mounting therein, at either the left side or the right side thereof, or both, of latch means 22 in which complementary latch means, e.g., pin 21, secured by welding or the like to the left of free vertical edge of door section or element 18, may be secured when it is desired to maintain door section 18 in closed position. Latch means 22 comprises guides 16B secured in apertures or slots 16A by fastening means such as spring clips, split rivets, nuts and bolts, or like fastening means of known type. Guides 16B have a cut-away front edge in the nature of a half-moon or V to receive pins 21 on door section 18 for securement thereof. Latch means 22 is completed by vertical lock bar 16C slideably secured in guides 16B, which bar is moveable upwardly and downwardly and provided with downwardly protuberant hook-like arms having an inwardly- and downwardly-angled lower edge so located and adapted to be struck by pins 21 on door section 18 when the door section is closed, thereby forcing bar 16C upwardly and permitting pins 21 to enter into inner cutouts or apertures in bar 16C behind said hook-like arms, whereupon bar 16C drops downwardly by gravity to secure pins 21 in the apertures of bar 16C. Although bar 16C when vertically arranged drops down automatically to secure pins 21, it must be raised manually to disengage pins 21 from the apertures in bar 16C for opening of the door section 18. The same structure is provided at or near the upper and lower ends of bar 16C to accommodate both of pins 21. A further aperture may be provided in bar 16C adjacent one or both of guides 16B and one or both of guides 16B may be provided with a further pin extending into or through said aperture or apertures in bar 16C to act as a stop mechanism to prevent bar 16C from dropping through both guide members 16B when pins 21 are not secured in latch means 22. Finally, an aperture may be provided in lock bar 16C just below a guide or guides 16B for the insertion therein or therethrough of a pin or padlock to prevent raising of the lock bar 16C for freeing up pins 21 and opening of door section 18 once the desired animal is within the cage and the door section 18 secured in closed position. Alternatively, any other combination of latch means on door section 18 cooperating with latch means on face plate 16, preferably such combination as provides automatic latching upon closure of door section 18 and means for securing the door in closed position, may be employed, and many such combinations of latch means for such purpose are known in the art and will be found suitable.

In FIGS. 1 and 7, stronger wires or rods defining the outer peripheries of the various cage sections are identified as 13, but it is to be understood that the interior of the various cage sections need not comprise smaller gauge wire or rods or be crisscrossed, but may if desired be of similar wire or rod construction of either horizontal or vertical disposition or both and of similar gauge and/or circumference as the outer peripheral rods or wires 13, according to the desire of the veterinarian, animal husbandryman, or technician in charge. It is sometimes advantageous to employ individual stainless steel rods or wires running vertically from top to bottom of a wall section and spaced apart, e.g., approximately one inch apart, which in certain instances avoids the necessity of horizontal wires or rods in the cage structure and economizes and strengthens due to minimization of spot welding sites.

Figure 5:
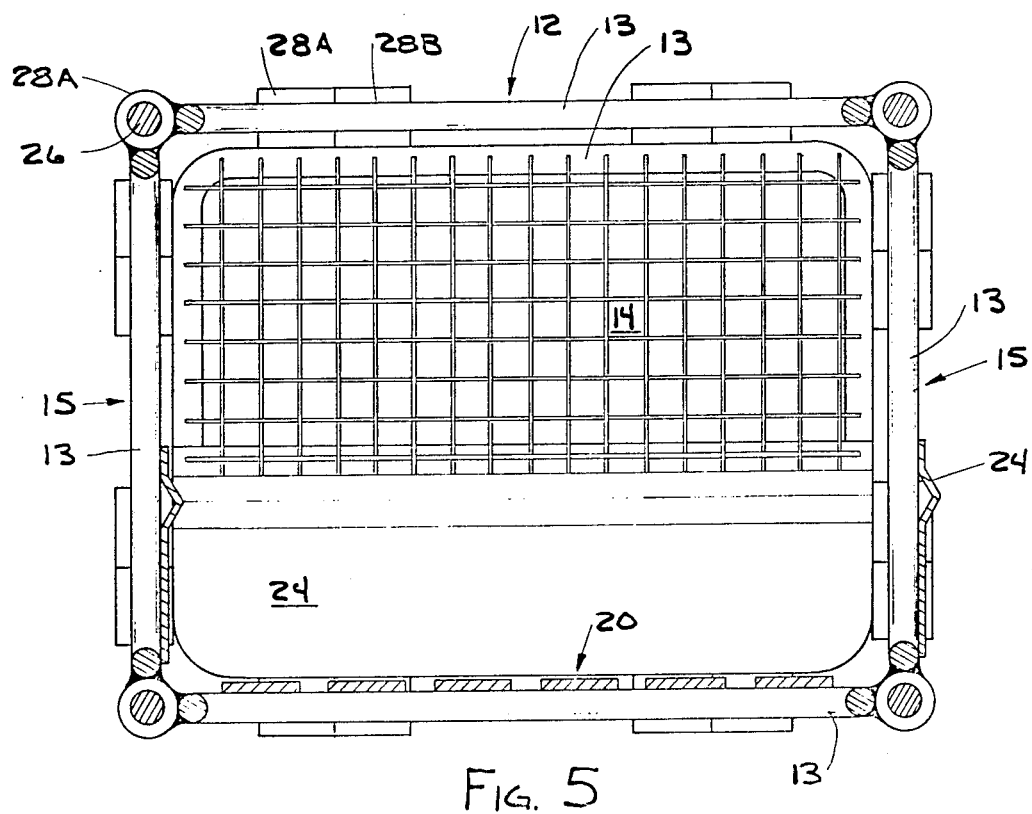
FIG. 5 is an enlarged cross-sectional view along the line 5——5 of FIG. 1 looking toward the rear of the cage unit taken between two (2) complementary juxtapositioned connecting sockets or sleeves 28A and 28B.

Floor section 20 as shown comprises a plurality of spaced-apart slats or straps supported on cross braces, and side wall sections 15 comprise splash guards or panels as the lower horizontal segments thereof, as does rear wall section 14, these generally being of an equal or approximately equal height, but floor section 20 may comprise any grate or combination of slats or straps or any other flooring of foraminous nature with sufficiently large foraminae to enable animal waste material to drop therethrough so as to maintain a hygienic condition in the cage unit proper. As shown in FIG. 5, side wall sections 15 including splash guards or panels 24 are modular, the splash guards 24 there shown being located on the same side of side sections 15, as shown on the right side, with even the protuberances on the splash guards 24 facing in the same direction.

Referring again to FIG. 5, looking backward to the rear of the assembled cage unit along line 5——5 of FIG. 1, which extends through the juncture between complementary sleeves 28A and 28B, all of the elements previously described are visible, along with splash guard 24 at the bottom of rear wall section 14, and relatively rigid structural rods 13 defining the perimeter of the various cage sections are clearly indicated, the entire FIG. 5 being enlarged.

Figure 2:
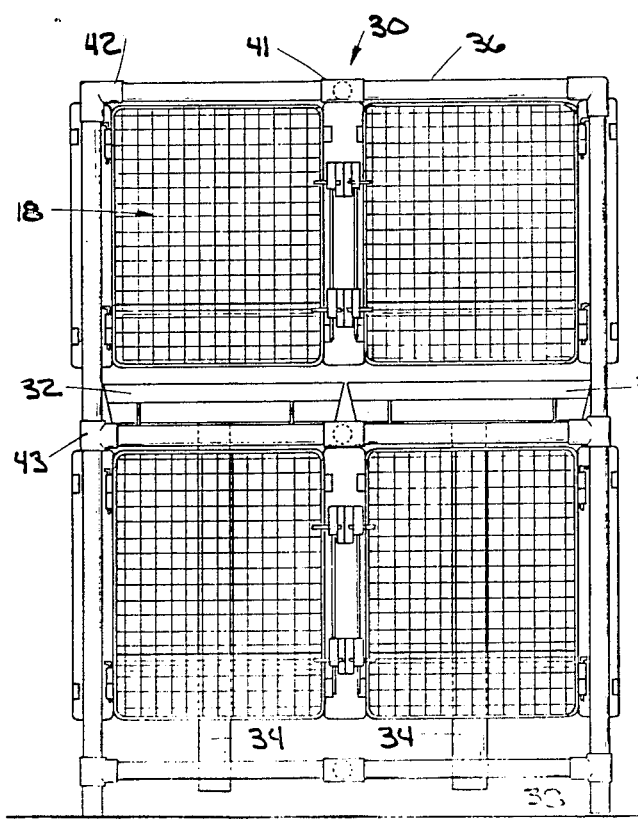
FIG. 2 is a front view of four (4) cage units according to the invention assembled in side-by-side relation and suspended from a frame unit according to the invention.

In FIG. 2 is shown generally an assembly of a plurality of the cage units of FIG. 1. As shown, two (2) cage units are located in side-by-side relation, with the door section 18 on the right cage unit being swung from right to left and the door section 18 on the left cage unit being swung from left to right, both secured by pins 21 and cooperating latch means 22 as previously described, centrally located on face plate 16 between the two (2) cage units. Exactly the same arrangement exists for the two (2) lower cage units as for the two (2) upper cage units, except that wash pan 32 with cooperating drain means, i.e., tube 34, is located beneath each of the two (2) upper cage units for ready flushing and washing out of animal waste dropped into pan 32 from floor section 20 of the superposed animal cage units through the slots in bottom section 20, the excrement and other debris from the generally vertical drain means, e.g., drain tube 34, exiting to the floor below at 38. As noted in FIG. 3, a side view of the cage units of FIG. 2, the entire assembly 30 can be located a distance D from the wall 31 to enable convenient cleaning not only underneath the cage assembly but also behind the same.

Figure 3:
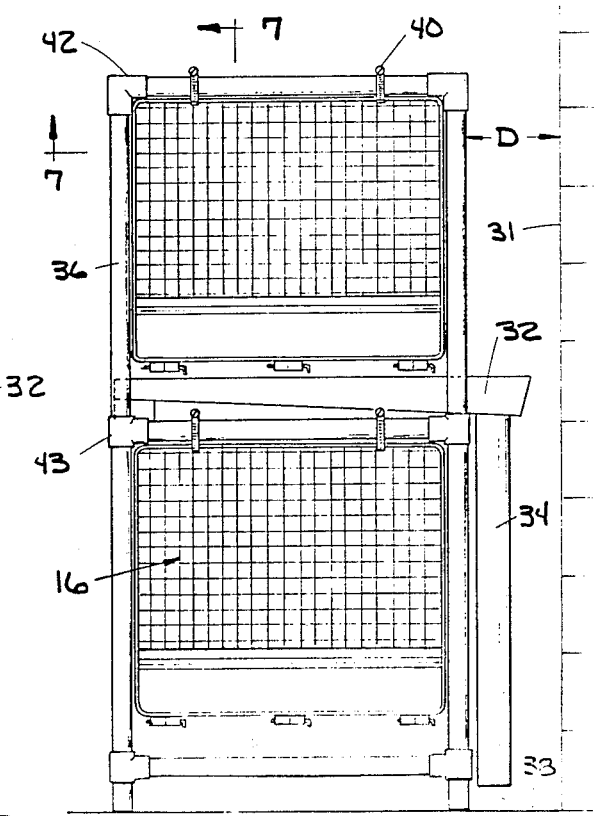
FIG. 3 is a side view of the cage assembly of FIG. 2.

In FIGS. 2 and 3, the cage assemblies 30 are suspended from and supported by modular frame units 49, shown independently in side view in FIG. 8 and in top view in FIG. 9, which as desired may or may not be equipped with rolling means at their lower extremities, said frame units again being of modular construction involving 4-way T connections 43 and 3-way elbows 42, connecting lengths of horizontal pipe or tube 36 and lengths of vertical pipe 36, all pipe sections being of the same length for utmost convenience in assembly. In top view at 48, as shown in FIG. 9, 3-way elbows 42 are again visible as well as 3-way. T connections, there identified as 41.

It is apparent that, due to the modular nature of the cage units and the cage elements, including face plates 16, depending upon the desired assembly, the arrangement of the cage units in any particular framing arrangement desired could be reversed and that, due to the modular nature of face plate 16, the door sections of the cage units could open from left to right or right to left in any desired sequence or arrangement, and that maximum use of face plate 16 with appendant latch means and sleeve or socket elements can be effected when the face plate and latch means are located between two adjacent cage units as shown in the frontal view 30 of FIG. 2.

As shown in FIG. 3, and as better shown in FIG. 7, the outer perimeter or peripheral rods or wires 13 are engaged or surrounded by suspending means 40 which also engage or surround transverse or horizontal frame members 36, suspending means 40 being present in at least two spaced positions at the top reach of each side section 15 of the cage unit, thereby effecting suspension of the cage unit from a horizontal member or crossbar 36 of frame 49. As shown, and as particularly apparent from FIG. 7, such suspending means 40 may conveniently take the form of a hose clamp, secured together by means of a screw into a threaded or tapped section or by means of a nut and bolt extending through both sides of the hose clamp. In this manner, since no contact is effected between the cage units and the frame units, the frame units can take the form of galvanized angle iron, rods, tubes, pipes and suitable fittings even though the cage unit proper is as usual constructed entirely or mainly of stainless steel or other rustproof material. The same manner and means of suspending the various cage units shown in FIGS. 2 and 3 from horizontal frame members is employed, regardless of the location of the cage unit in the multiple cage assembly within the frame.

FIG. 6 shows at 46 back or rear cage sections in vertical position and in close juxtaposition for washing, storage, or reassembly, whereas the same panels are shown in horizontal position at 44, it being understood that the same close or compact "packaging" of the various other cage sections, such as sides, tops, bottoms, doors, and fronts, can readily be effected due to their modular nature.

In FIG. 9A is shown an enlarged view of the complementary juxtapositioned sockets or sleeves 28A and 28B, at the marginal lower edges of a side section 15, having a splash guard 24, and a bottom section 20, the connecting lock pin 26 in this case being shown with a spring-biased bearing or detent ball 50 which snaps up and into position after insertion of lock pin 26 into and preferably through both cooperating or matching juxtapositioned sleeves 28A and 28B to releasably secure the same, together with the adjacent or contiguous cage sections, in position until the lock pin 26 is removed. FIG. 9B shows an alternate structure wherein the lock pin 26 is fitted at its one end with a grommet or knock-off washer 51 of soft metal, rubber, elastomer, or the like, which may for convenience simply be hammered on and off of the end of connecting lock pin 26 or affixed thereto and/or removed therefrom with the aid of suitable pliers or the like. Although a detent ball 50 as shown in FIG. 9A is advantageous from the standpoint of security, it is also somewhat more expensive and a grommet or knock-off washer 51, which is generally considerably more economical, or similar means, is usually sufficient to secure releasably the connecting lock pins 26 within juxtapositioned cooperating and aligned sleeves 28A and 28B as well as 29A and 29B comprising the door section hinge elements. In a less advantageous embodiment, lock pin 26 may be employed without special securement means such as detent ball 50 or washer or grommet 51 for securement of the lock pin within the apertures of sockets or sleeves 28A/28B or 29A/29B. In such case, the tolerance between the apertures and the pin diameter or circumference is preferably minimized to enable simple knocking or pushing of the pin into and knocking or pushing of the pin out of the apertures, and in such case the pin is advantageously constructed of sufficiently soft material, e.g., soft metal or relatively hard plastic, to ensure that the pin remains secured within the apertures of the sockets or sleeves under conditions of use.

The lock pin 26 may if desired also be provided with a small aperture near the end of the small reach or arm thereof for purposes of permitting insertion of a pin or other instrument or tool to assist with more rapid removal of the lock pin 26 from complementary juxtapositioned sockets or sleeves 28A/28B or 29A/29B.

The modular elements of the modular cage units of the present invention can be dismantled and stored side-by-side in boxes or the like, it now being possible to store the modular elements of cage units which would normally occupy approximately 20 rooms in a single room when disassembled and stored side-by-side. In addition, the modular frame units upon which the cage units are suspended according to the invention can likewise be dismantled and, because of the suspension aspect of the invention, the framing can be of rough or galvanized pipe, tubing, or angle iron and not be of stainless steel. Moreover, the rough or galvanized tubing, pipe, or angle iron employed for the frame units according to the invention are preferably so dimensioned that any piece of the frame can go together with any other piece of the frame, all sides of the framing being the same and all lengths of pipe or tubing being the same so that the frame can be made square or rectangular or circular (as shown) or in any other desired cross-sectional configuration, all fronts and backs and sides and tops and bottoms and face plates and doors of the cage units being interchangeable and the various reaches of the framing also being interchangeable. Likewise, the wash-out pans and associated drain means, e.g., pipes, are likewise modular in nature and interchangeable and can be conveniently constructed of PVC or like plastic and as shown supported on the frame or frame members and not by the cage units themselves. It goes without saying that the frame units can be extended so as to support not only two (2) cages side-by-side at a top level thereof and two (2) cages at a lower level thereof, but also a single cage or any plurality of cages side-by-side in excess of such number, for example, two, four, six, eight, or the like, both at the top level and the bottom level of the frame structure, which may of course have more than two (2) levels, thereby providing a most economical, convenient, and hygienic cage unit, cage assembly, and cage and frame assembly which can be readily assembled and/or disassembled for washing as well as storage and rapidly reassembled for further use.

It will be obvious to one skilled in the art that, with proper dimensioning, the cage unit and the cage assembly of the present invention, and the modular elements making up the same, are utilizable for the hygienic containment of a variety of animals and birds, but are particularly adaptable to medium size animals as generally employed for pharmacological and toxicological evaluation of drugs, poisons, aerosols, and the like, and that with proper selection of the gauge of the wire mesh employed, or with simple replacement of the mesh by rods, bars, or wires of suitable gauge, whether running horizontally or vertically or both, a very wide variety of cage units and assemblies, suitable for the containment of almost any imaginable reasonably-sized animal or bird, can be devised without departing from the spirit or scope of the invention and without sacrificing the advantages thereof.

In conclusion, from the foregoing, it is apparent that the present invention provides novel knock-down modular cage units and cage assemblies, in turn erected from standard modules or modulae, since elements thereof are identical and can be used interchangeably to the fullest extent possible, as further explained in the foregoing, and which erected cage units or cage assemblies may be suspended for ready and rapid release from suitable modular or other frame units or structures without the necessity of contact with the same, thereby enabling the employment of less expensive material, e.g., piping or tubing, for erection of the mounting or frame means, all of which may be assembled or disassembled conveniently and economically and washed or stored in the disassembled condition with minimum space, time, and labor requirements, and all having the further characteristics and advantages as enumerated in the foregoing.

It is to be understood that the invention is not to be limited to the exact details of operation, or to the exact compositions, methods, procedures, or embodiments shown and described, as obvious modifications and equivalents will be apparent to one skilled in the art, and the invention is therefore to be limited only by the full scope which can be legally accorded to the appended claims.

We claim:

1. A knock-down cage unit for animals or the like which is capable of rapid assembly and disassembly comprising the following elements in combination:

a pair of side walls sections, a top wall section, and a rear wall section, each of said sections being essentially rectangular and consisting essentially of a plurality of wires framed peripherally by wire or rod, and a bottom wall or floor section having openings therein, and each of said sections comprising at peripheral edges a plurality of short sockets or sleeves adapted to juxtapose and align with complementary sockets or sleeves at peripheral edges of adjacent or contiguous wall sections, the total length of the combined sockets on any section peripheral edge being much less than the total length or reach of that edge, said sockets or sleeves when complementarily juxtaposed and aligned being adapted to be releasably secured together by the insertion of a plurality of unconnected and independently releasable lock pins therein, and lock pins in sockets or sleeves on adjacent or contiguous wall sections releasably securing said sections and forming a rectangular cage unit which is open at the front, said side and/or rear wall sections comprising optional splash-guard segments at the lower portions thereof.

2. The age unit of claim 1 comprising face plates secured at the front peripheral edges of wall sections, a first face plate attached to one of said wall sections comprising a plurality of sockets or sleeves, and a second face plate attached to an opposite wall section comprising latch means, a door section comprising at its one peripheral edge complementary sockets or sleeves adapted to juxtapose and align with the plurality of sockets or sleeves on said first face plate, lock pins in said sockets or sleeves on said first face plate and on said peripheral edge of said door section for hinging said door to said face plate, and cooperating latch means on the opposite peripheral edge of said door section, whereby said door section may be swung upon hinges on said first face plate on said one wall section into juxtaposition with the second face plate on the other of said wall sections, thereby closing the open front of said cage unit, and whereby said door may be secured in closed position by said latch means on said door section and by said cooperating latch means on said second face plate.

3. The structure of claim 2, wherein said latch means on said face plate comprises a plurality of guides and a lock bar slideably retained therein adapted to receive and retain cooperating latch means on the unhinged peripheral edge of said door section.

4. The structure of claim 1, wherein said lock pins comprise detent bans for releasably securing said lock pins in said juxtapositioned complementary sockets or sleeves.

5. The structure of claim 1, wherein said lock pins comprise grommets or knock-off washers for releasably securing said lock pins in said juxtapositioned complementary sockets or sleeves.

6. The structure of claim 1, wherein said side wall sections and/or rear wall sections comprise splash guards as lower segments thereof.

7. The structure of claim 1, wherein said bottom wall or floor section comprises a foraminous member of sufficient strength to support the animal weight and with sufficiently large foraminae therein to allow the dropping of animal waste material therethrough.

8. The structure of claim 7, wherein said bottom wall or floor section comprises a series of spaced-apart straps or slats.

9. A plurality of knock-down cage units for animals or the like, said units being capable of rapid assembly and disassembly and comprising the following elements in combination:

a pair of side wall sections, a top wall section, and a rear wall section, each of said sections being essentially rectangular and consisting essentially of a plurality of wires framed peripherally by wire or rod, and a bottom wall or floor section having openings therein, and each of said sections comprising at peripheral edges a plurality of short sockets or sleeves adapted to juxtapose and align with complementary sockets or sleeves at peripheral edges of adjacent or contiguous wall sections, the total length of the combined sockets on any section peripheral edge being much less than the total length or reach of that edge, said sockets or sleeves when complementarily juxtaposed and aligned being adapted to be releasably secured together by the insertion of a plurality of unconnected and independently releasable lock pins therein, and lock pins in sockets or sleeves on adjacent or contiguous wall sections releasably securing said sections and forming a rectangular cage unit which is open at the front, said side and/or rear wall sections comprising optional splash-guard segments at the lower portions thereof, said modular cage units being suspended in a frame unit comprising upright members and horizontal or transverse members by suspension means securing said cage units, at their upper peripheral edges, to transverse members of said frame unit, whereby said cage units are suspended from said frame unit without the necessity of coming into contact with said frame unit.

10. The cage and frame assembly of claim 9, wherein said frame unit comprises upper and lower transverse members and wherein cage units are suspended in vertical juxtaposition to each other from both upper and lower transverse members of said frame unit.

11. The cage and frame assembly of claim 10, comprising also a wash-out tray beneath the bottom wall or bottom section of an upper cage unit associated with generally vertical drain means to facilitate convenient removal of waste material from said upper cage unit.

12. The assembly of claim 9, wherein said suspending means comprises a plurality of hose clamps suspending upper peripheral edges of cage units in spaced relation from a transverse member of the frame unit.

13. The assembly of claim 9, wherein said frame unit comprises horizontal and vertical members which are of the same length and of the same cross-sectional configuration.

14. A plurality of cage units as in claim 9, in side-by-side relationship, having a centrally located face plate with a pair of latch means thereon in side-by-side relationship, the door sections of said side-by-side cage units being respectively hinged at the right and left of said cage units and adapted to have the latch means on the unhinged peripheral edges of said door sections secured by said pair of latch means on said centrally-located face plates.

15. A plurality of knock-down cage units for animals or the like, said units being capable of rapid assembly and disassembly and comprising the following elements in combination:
   a pair of side wall sections, a top wall section, and a rear wall section, each of said sections being essentially rectangular and consisting essentially of a plurality of wires framed peripherally by wire or rod, and a bottom wall or floor section having openings therein, and each of said sections comprising at peripheral edges a plurality of short sockets or sleeves adapted to juxtapose and align with complementary sockets or sleeves at peripheral edges of adjacent or contiguous wall sections, the total length of the combined sockets on any section peripheral edge being much less than the total length or reach of that edge, said sockets or sleeves when complementarily juxtaposed and aligned being adapted to be releasably secured together by the insertion of a plurality of unconnected and independently releasable lock pins therein, and lock pins in sockets or sleeves on adjacent or contiguous wall sections releasably securing said sections and forming a rectangular cage unit which is open at the front, said side and/or rear wall sections comprising optional splash-guard segments at the lower portions thereof,
   said cage units comprising face plates secured at the front peripheral edges of wall sections, a first face plate attached to one of said wall sections comprising a plurality of sockets or sleeves, and a second face plate attached to an opposite wall section comprising latch means, a door section comprising at its one peripheral edge complementary sockets or sleeves adapted to juxtapose and align with the plurality of sockets or sleeves on said first face plate, lock pins in said sockets or sleeves on said first face plate and on said peripheral edge of said door section for hinging said door to said face plate, and cooperating latch means on the opposite peripheral edge of said door section, whereby said door section may be swung upon hinges on said first face plate on said one wall section into juxtaposition with the second face plate on the other of said wall sections, thereby closing the open front of said cage unit, and whereby said door may be secured in closed position by said latch means on said door section and by said cooperating latch means on said second face plate,
   said modular cage units being suspended in a frame unit comprising upright members and horizontal or transverse members by suspension means releasably securing said cage units, at their upper peripheral edges, to transverse members of said frame unit, whereby said cage units are suspended from said frame unit without the necessity of coming into contact with said frame unit.

16. The cage and frame assembly of claim 15, wherein said frame unit comprises upper and lower transverse members and wherein cage units are suspended in vertical juxtaposition to each other from both upper and lower transverse members of said frame unit.

17. The cage and frame assembly of claim 16, comprising also a wash-out tray beneath the bottom wall or bottom section of an upper cage unit associated with generally vertical drain means to facilitate convenient removal of waste material from said upper cage unit.

18. A plurality of cage units as in claim 15, in side-by-side relationship, having a centrally located face plate with a pair of latch means thereon in side-by-side relationship, the door sections of said side-by-side cage units being respectively hinged at the right and left of said cage units and adapted to have the latch means on the unhinged peripheral edges of said door sections secured by said pair of latch means on said centrally-located face plate.

19. A knock-down cage unit for animals or the like which is capable of rapid assembly and disassembly comprising the following elements in combination:
   a pair of side wall sections, a top wall section, and a rear wall section, each of said sections being essentially rectangular and consisting essentially of a plurality of wires framed peripherally by wire or rod, and a bottom wall or floor section having openings therein, and each of said sections comprising at peripheral edges a plurality of short sockets or sleeves adapted to juxtapose and align with complementary sockets or sleeves at peripheral edges of adjacent or contiguous wall sections, the total length of the combined sockets on any section peripheral edge being much less than the total length or reach of that edge, said sockets or sleeves when complementarily juxtaposed and aligned being adapted to be releasably secured together by the insertion of a plurality of unconnected and independently releasable lock pins therein, and lock pins in sockets or sleeves on adjacent or contiguous wall sections releasably securing said sections and forming a rectangular cage unit which is open at the front.

20. The cage unit of claim 19 comprising a door section having one peripheral edge thereof hingedly mounted at the front of one wall section, latch means comprised on the front of an opposite wall section, and cooperating latch means comprised on a peripheral edge of said door section opposite to said hingedly mounted peripheral edge, whereby said door section may be swung upon its hinges at the front of said one wall section into juxtaposition with the front of the other of said wall sections, thereby closing the open front of said cage unit, and whereby said door may be secured in closed position by said latch means on said door section and by said cooperating latch means at the front of said wall section.

21. The cage unit of claim 19 comprising a door section having one peripheral edge thereof hingedly mounted at the front of one side wall section, latch means comprised on the front of an opposite side wall section, and cooperating latch means comprised on a peripheral edge of said door section opposite to said hingedly mounted peripheral edge, whereby said door section may be swung upon its hinges at the front of said one side wall section into juxtaposition with the front of the other of said side wall sections, thereby closing the open front of said cage unit, and whereby said door may be secured in closed position by said latch means on said door section and by said cooperating latch means at the front of said side wall section.

22. A modular cage unit suspended in a frame unit comprising upright members and horizontal or transverse members by suspension means releasably securing said cage unit, at its upper peripheral edges, to transverse members of said frame unit, whereby said cage unit is suspended from said frame unit without the necessity of coming into contact with said frame unit, said modular cage unit comprising a pair of side wall sections, a top wall section, and a rear wall section, each of said sections being essentially rectangular and consisting essentially of a plurality of wires framed peripherally by wire or rod, and a bottom wall or floor section having openings therein, and each of said sections comprising at peripheral edges a plurality of short sockets or sleeves adapted to juxtapose and align with complementary sockets or sleeves at peripheral edges of adjacent or contiguous wall sections, the total length of the combined sockets on any section peripheral edge being much less than the total length or reach of that edge, said sockets or sleeves when complementarily juxtaposed and aligned being adapted to be releasably secured together by the insertion of a plurality of unconnected and independently releasable lock pins therein, and lock pins in sockets or sleeves on adjacent or contiguous wall sections releasably secured said sections and forming a rectangular cage unit which is open at the front.

23. Structural knock-down cage elements adapted to be erected into a cage unit for animals or the like which cage unit is capable of rapid assembly and disassembly comprising the following elements;
a pair of side wall sections, a top wall, at least one planar side wall face plate and a rear wall section, each of said sections being essentially rectangular and consisting essentially of a plurality of wires framed peripherally by wire or rod, and a bottom wall or floor section having openings therein, and each of said sections comprising at peripheral edges a plurality of short sockets or sleeves adapted to juxtapose and align with complementary sockets or sleeves at peripheral edges of adjacent or contiguous wall sections, the total length of the combined sockets on any section peripheral edge being much less than the total length or reach of that edge, said sockets or sleeves when complementarily juxtaposed and aligned being adapted to be releasably secured together by the insertion of a plurality of unconnected and independently releasable lock pins therein, wherein at least one side wall section and/or rear section comprises a splash guard as a lower segment thereof.

* * * * *

UNITED STATES PATENT AND TRADEMARK OFFICE
CERTIFICATE OF CORRECTION

Sheet 1 of 3

PATENT NO. : 4,917,047
DATED : April 17, 1990
INVENTOR(S) : Francis X. Wazeter, III It is certified that error appears in the above-identified patent and that said Letters Patent is hereby corrected as shown below:

Drawings, Sheet 1, Figure 2, 1st number up from the bottom;

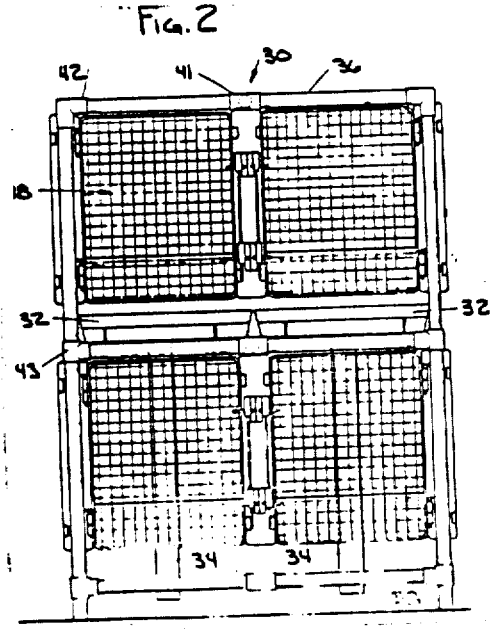

Unclear number should read -- 38 --.

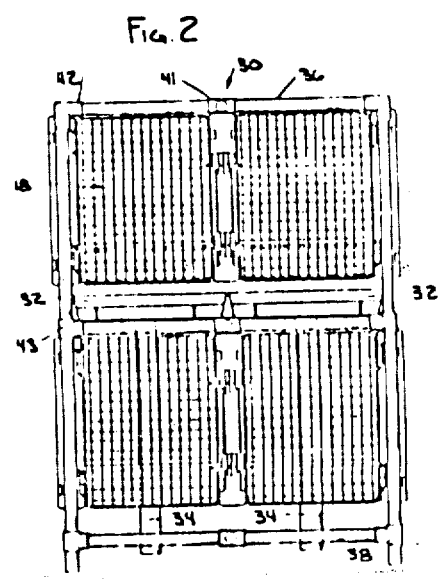

UNITED STATES PATENT AND TRADEMARK OFFICE
CERTIFICATE OF CORRECTION

PATENT NO. : 4,917,047

DATED : April 17, 1990

INVENTOR(S) : Francis X. Wazeter, III

It is certified that error appears in the above-identified patent and that said Letters Patent is hereby corrected as shown below:

Drawings, Sheet 1, Figure 3, 1st number up from the bottom;

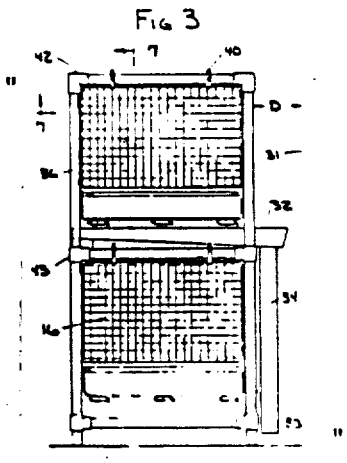

Unclear number should read -- 38 --.

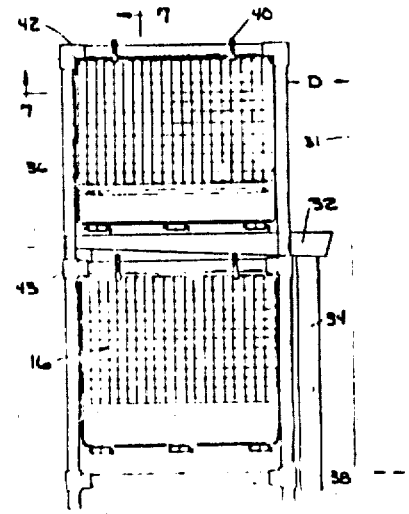

Drawings, Sheet 3, all four numbers on bottom row unclear, should read -- 28A, Fig. 9A, 28B, 20 --.

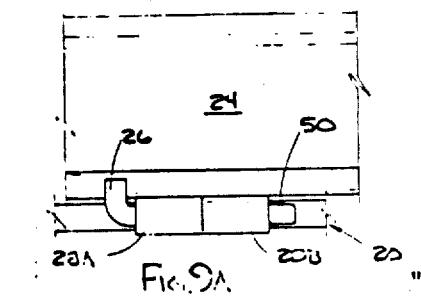

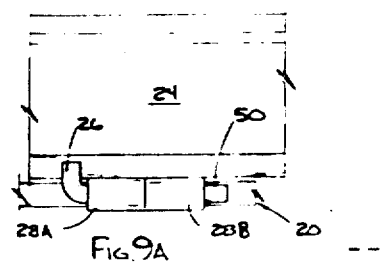

UNITED STATES PATENT AND TRADEMARK OFFICE
CERTIFICATE OF CORRECTION

PATENT NO. : 4,917,047

DATED : April 17, 1990

INVENTOR(S) : Francis X. Wazeter, III

It is certified that error appears in the above-identified patent and that said Letters Patent is hereby corrected as shown below:

```
Column 1, line 59; "an" should read -- and --.
Column 3, line 14; "complimentarily" should read
   -- complementarily --.
Column 4, line 31; "pi" should read -- pin --.
Column 6, line 21; "fully erected" should read -- fully-erected --
Column 8, line 56; "3-way.T" should read -- 3-way T --.
Column 11, line 33; "walls" should read -- wall --.
Column 11, line 56; "age" should read -- cage --.
Column 12, line 15; "bans" should read -- balls --.
Column 16, line 8; "secured" should read -- securing --.
```

Signed and Sealed this

Fourteenth Day of May, 1991

Attest:

HARRY F. MANBECK, JR.

*Attesting Officer*     *Commissioner of Patents and Trademarks*